(12) United States Patent
Hirose (10) Patent No.: US 7,360,749 B2
(45) Date of Patent: Apr. 22, 2008

(54) RUBBER MOLDED ARTICLE VULCANIZING MOLD, AND METHOD FOR CLEANING THE SAME

(75) Inventor: Kouji Hirose, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 696 days.

(21) Appl. No.: 10/501,193

(22) PCT Filed: Feb. 25, 2003

(86) PCT No.: PCT/JP03/02024

§ 371 (c)(1),
(2), (4) Date: Jul. 9, 2004

(87) PCT Pub. No.: WO03/070443

PCT Pub. Date: Aug. 28, 2003

(65) Prior Publication Data

US 2005/0082704 A1 Apr. 21, 2005

(30) Foreign Application Priority Data

Feb. 25, 2002 (JP) ............................. 2002-048214
Feb. 25, 2002 (JP) ............................. 2002-048241

(51) Int. Cl.
*B29C 33/10* (2006.01)
(52) U.S. Cl. .................... 249/141; 425/28.1; 425/420; 425/812

(58) Field of Classification Search ............... 425/28.1, 425/35, 812, 420; 249/141
See application file for complete search history.

(56) References Cited

U.S. PATENT DOCUMENTS 5,922,237 A * 7/1999 Green .......................... 249/141
6,817,848 B2 * 11/2004 Ishihara ...................... 425/28.1

FOREIGN PATENT DOCUMENTS

| EP | 774333 A2 | 5/1997 |
|---|---|---|
| JP | 6-262630 A | 9/1994 |
| JP | 9-141660 A | 6/1997 |
| JP | 10-44154 A | 2/1998 |
| JP | 2002-234033 A | 8/2002 |

* cited by examiner

*Primary Examiner*—Michael Barr
*Assistant Examiner*—Saeed Chaudhry
(74) *Attorney, Agent, or Firm*—Sughrue Mion, PLLC (57) ABSTRACT

Semi-circular cover members 17 and 17 having a spring function for opening and closing the openings of pores 15S are provided on the cavity inner wall side of a porous air vent 15 in order to close the openings of the above pores 15S while a small space remains between the above cover members 17 and 17 and the openings of the pores 15S of the porous air vent during vulcanization, whereby the occurrence of the occlusion of the above pores 15S is reduced and stains adhered to the cavity inner wall side of the mold 10 are removed by physical means such as a blast treatment while the above cover members 17 and 17 are closed at the time of cleaning to remove the stains of the above mold 10. Further, the above openings are opened as required to allow a cleaning liquid 24 go into the above pores 15S to clean the above mold 10 and remove stains in the pores 15S.

7 Claims, 8 Drawing Sheets

RUBBER MOLDED ARTICLE VULCANIZING MOLD, AND METHOD FOR CLEANING THE SAME

BACKGROUND OF THE INVENTION

1. Field of the Invention

The present invention relates to a vulcanizing mold for vulcanizing and molding a rubber molded article such as a tire and to a cleaning method for the same.

2. Description of the Prior Art

To form a tire, a vulcanizing mold (to be referred to as "mold" hereinafter) is used in which pressure is applied to the inside of the molded green tire to pressure contact the outer surface of the above green tire to the inner wall of the heated mold in order to vulcanize the crude rubber by heat and pressure. Exhaust passages such as micro-vents, slits, vent holes or cross vents are formed in this mold to remove air contained between the outer surface of the tire and the mold and gas generated from the green tire. However, when the above micro-vents, slits, vent holes or cross vents are used, a rubber material enters the holes of the vents during molding and a large number of projections called "spew" are formed on the surface of the vulcanized tire, thereby impairing the appearance of the tire. Therefore, trimming is indispensable. Even when trimming is carried out, the height of trimming may vary or part of the tire may be untrimmed, which is not preferred from the viewpoint of the appearance of the tire. In addition, a trimming apparatus is required, thereby boosting cost. Since the occlusion of vent holes caused by the slivering of spew occurs in the mold, the spew must be removed by using a tool such as a drill. However, as there are hundreds of vent holes in the mold, the work of removing the spew takes a lot of time and labor. In the case of cross vents, the spew cannot be removed by using a tool or the like.

A film-like projection called "lip" is formed in the case of slits, which is not preferred from the viewpoint of the appearance of the tire. When a large lip crossing the main groove of the tire is formed, it may dam the main groove having a drainage function to prevent drainage, thereby causing a problem with safety driving, such as triggering of hydro-planing while driving on a wet road.

To cope with the above problem, a mold having porous air vents, each comprising a porous member having a large number of pores for transmitting only gas formed in a substrate such as a metal substrate or a porous member made from a porous material having a large number of pores such as a sintered metal, has been developed as a mold which does not require the above trimming step.

Figure 9A:
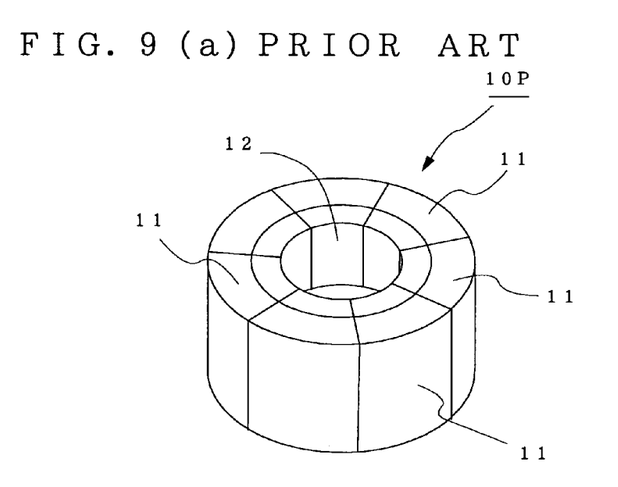
FIGS. 9(A) to 9(C) are diagrams showing the constitution of a vulcanizing mold for rubber molded articles having porous air vents of the prior art.
Figures 9B, 9C:
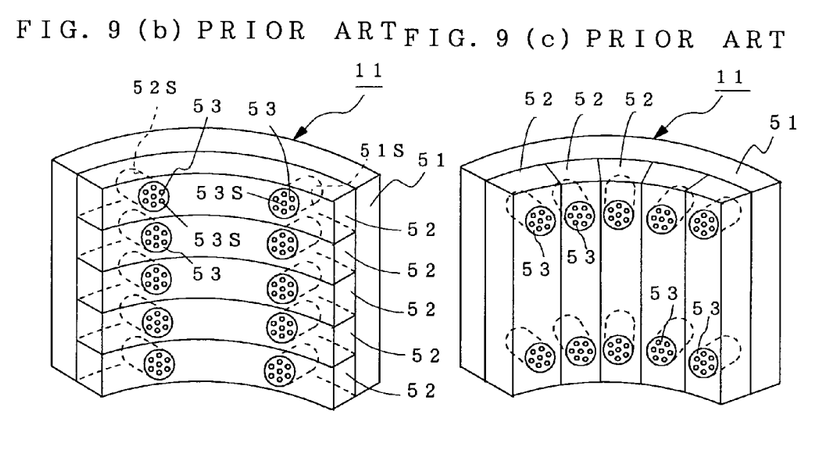

FIGS. 9(A) to (C) show an example of a vulcanizing mold 10P for rubber molded articles having porous members of the prior art. This vulcanizing mold 10P for rubber molded articles is made by putting together a plurality of segments 11 into a substantially cylindrical form, and an opening 12 into which a rubber material (bladder) for supplying a green tire to be vulcanized, heat and pressure is inserted is formed in the core portion of the above mold 10P. Each of the above segments 11 consists of an outer case 51 made from a steel material and a plurality of aluminum pieces 52 secured to the inner wall of the outer case 51 by unshown bolts. The surfaces (portions exposed to the inner wall of the mold 10P) of the above pieces 52 are tire forming surfaces, that is, portions to which the rubber of the green tire to be vulcanized is contacted.

Figures 10A, 10B:
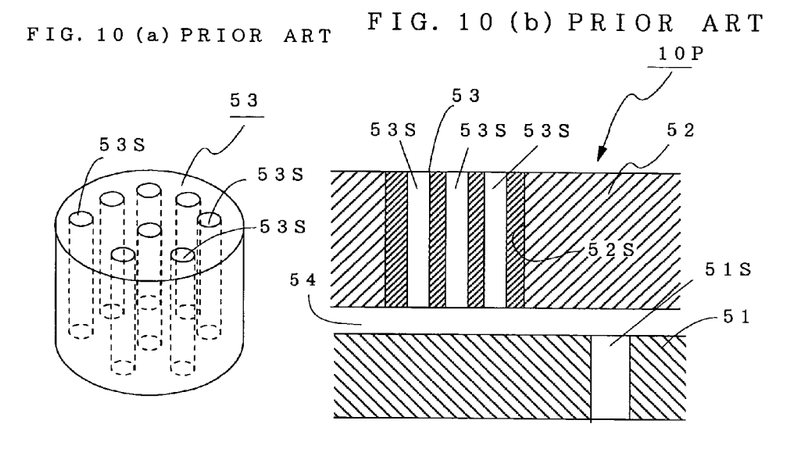
FIGS. 10(A) and 10(B) are diagrams showing the constitution of a porous air vent of the prior art.

A plurality of holes 52S which communicate with exhaust holes to be described hereinafter formed in the outer case 51 are formed in each of the above pieces 52. A plurality of vent pieces (to be referred to as "porous air vent" hereinafter) having a large number of straight pores 53S with a diameter of 10 to 40 μm and communicating with the exhaust holes 51S of the outer case 51 are fitted in the respective holes 52S as shown in FIGS. 10(A) and 10(B). In FIG. 10(B), an upper side (piece 52 side) of the figure is a rubber side and a lower side (outer case 51 side) of the figure is a mold side. Thereby, air between the mold 10P and the outer surface of the tire and gas generated from the green tire during vulcanization are absorbed from the above pores 53S which are exhaust passages by unshown exhaust means such as a vacuum pump connected to the above exhaust holes 51S and discharged to the outside of the mold 10P from the exhaust holes 51S of the outer case 51 through a gap 54 between the pieces 52 and the outer case 51.

Figure 11:
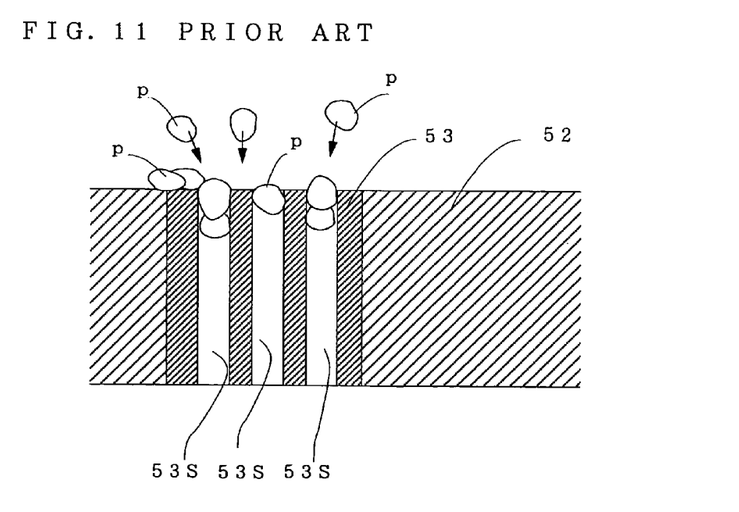
FIG. 11 is a diagram showing the state of the occlusion of the porous air vent of the prior art.

However, in the porous air vent 53 of the prior art, as shown in FIG. 11, since the diameters of the above pores 53S are fixed from the cavity side to the opposite side (outer case 51 side), when the occlusion of the pores 53S by plug materials p such as oil, chemicals and metal fumes discharged from the green tire during vulcanization and fine particles of a polymer and carbon occurs on the cavity side, it is difficult to discharge the above plug materials p to the exhaust side (outside of the mold 10).

When the above plug materials p adhere to the cavity side of each pore 53S like tar, the passage of the air vent is narrowed and the plug materials adhere to the pores 53S more easily and form a bridge to occlude the pores 53S, thereby greatly reducing exhaust efficiency and causing a tire failure in an early stage. Therefore, the above mold 10P must be cleaned frequently and the operation efficiency of the mold lop is low. Once the porous member is plugged, it is extremely difficult to remove the plug materials with a drill or the like. Particularly when the porous member is a sintered metal, as each opening constituting a ventilation passage is not straight, a special cleaning method must be used and it is difficult to clean the mold. When a sintered metal is used as the porous member, the meshed patch of each vent is formed on the surface of a tire, impairing the appearance of the tire.

When vulcanization is repeated, plug materials such as a rubber material and a polymer produced by the slivering of spew and fine particles of carbon adhered during vulcanization are firmly adhered to the surface of the mold, thereby staining the surface of the mold. To remove these stains on the surface of the mold, the following methods have been employed.

(1) physical methods for blasting a shot of plastic beads or glass beads, or dry ice, affixing cleaning rubber, or applying a laser beam or a jet of high-pressure water (so-called peeling; peeling of adhered products)

(2) physico-chemical methods making use of plasma, ultra-criticality to pseudo-criticality, and electrolysis (3) chemical methods for immersing a mold in an amine-based cleaning liquid (+), oxygen-based cleaning liquid or sodium bicarbonate-based cleaning liquid to expand stains and removing them by high-pressure water.

However, in the methods (1), only stains on the surface of the mold can be removed but stains in the exhaust passages cannot be removed and the surface of the mold may be damaged. In the methods (2), the electric erosion/melting or deformation/modification of the surface of the mold easily occurs.

In the methods (3), it takes time because the mold is cleaned only with a cleaning liquid, the cleaning liquid is apt to deteriorate, and chemical treatment equipment is needed. Therefore, the methods have economical and spatial problems.

It is an object of the present invention which has been made in view of the above problems of the prior art to provide a vulcanizing mold for rubber molded articles which suppresses the occurrence of the occlusion of exhaust passages with plug materials and makes cleaning easy as well as a method of cleaning the mold.

SUMMARY OF THE INVENTION

According to a first aspect of the invention, there is provided A vulcanizing mold for rubber molded articles having air vents, each having exhaust passages opened to a cavity inner wall side at one end and communicating with the exhaust holes of the mold at the other end, wherein a movable valve for opening and closing the openings of the exhaust passages and forming a small gap with the openings of the exhaust passages when it is closed is provided on the cavity inner wall side of each of the air vents and is closed during vulcanization to restrict the entry of plug materials into the exhaust passages in order to reduce the occlusion of the exhaust passages and the prevent the production of spew.

According to a second aspect of the invention, there is provided a vulcanizing mold for rubber molded articles, wherein the movable valve is composed of one or more cover members having an opening/closing mechanism.

According to a third aspect of the invention, there is provided a vulcanizing mold for rubber molded articles, wherein the cover members are a pair of semi-circular plates.

According to a fourth aspect of the invention, there is provided a vulcanizing mold for rubber molded articles, wherein the movable valve is a plate-like cover member having a spring function to be urged toward an open direction. Accordingly, the cover member is attracted toward the air vent by suction by means of exhaust means of the mold during vulcanization to close the exhaust passages and restrict the entry of plug materials into the above exhaust passages. Since the cover member is opened by the above spring mechanism at the time of cleaning, the insides of the exhaust passages can be easily cleaned.

According to a fifth aspect of the invention, there is provided a vulcanizing mold for rubber molded articles, wherein a stepped portion is formed by sputtering or etching the exhaust passage side of the cover member, and a gap between the cover member and the openings of the exhaust passages is maintained by this stepped portion.

According to a sixth aspect of the invention, there is provided a vulcanizing mold for rubber molded articles, wherein the air vents are porous air vents, each having a porous member with a large number of pores which transmit only gas.

According to a seventh aspect of the invention, there is provided a method of cleaning a vulcanizing mold for rubber molded articles having air vents, each having exhaust passages opened to a cavity inner wall side at one end and communicating with the exhaust holes of the mold at the other end, the method comprising removing stains adhered to the cavity inner wall side while a movable valve for opening and closing the openings of the exhaust passages and forming a small gap with the openings when it is closed is closed. That is, since the above movable valve is closed during vulcanization to restrict the entry of plug materials into the above exhaust passages, the rear side of the above movable valve and the exhaust passages are rarely stained. Therefore, the stains of the mold can be completely removed by separating stains on the cavity inner wall side including the front side of the movable valve while the movable valve is closed.

According to an eighth aspect of the invention, there is provided a method of cleaning a vulcanizing mold for rubber molded articles having air vents, each having exhaust passages opened to a cavity inner wall side at one end and communicating with the exhaust holes of the mold at the other end, the method comprising allowing a cleaning liquid go into the exhaust passages by opening the openings of the exhaust passages by means of a movable valve for opening and closing the openings and forming a small gap with the openings when it is closed to clean the mold.

According to a ninth aspect of the invention, there is provided a method of cleaning a vulcanizing mold for rubber molded articles, wherein the pressure on the cavity inner wall side is reduced after cleaning and the stains are discharged to the cavity inner wall side.

According to a tenth aspect of the invention, there is provided a method of cleaning a vulcanizing mold for rubber molded articles, wherein cleaning is ultrasonic cleaning.

According to an eleventh aspect of the invention, there is provided a method of cleaning a vulcanizing mold for rubber molded articles, wherein ultrasonic cleaning is carried out while ultrasonic wave generating means and the mold are moved relative to each other.

According to a third aspect of the invention, there is provided a method of cleaning a vulcanizing mold for rubber molded articles according to any one of claims 8 to 11, wherein cleaning is carried out by setting the temperature of the cleaning liquid to 35 to 80° C.

DETAILED DESCRIPTION OF THE PREFERRED EMBODIMENTS

The best embodiment of the present invention will be described hereinbelow with reference to the accompanying drawings.

Figure 1:
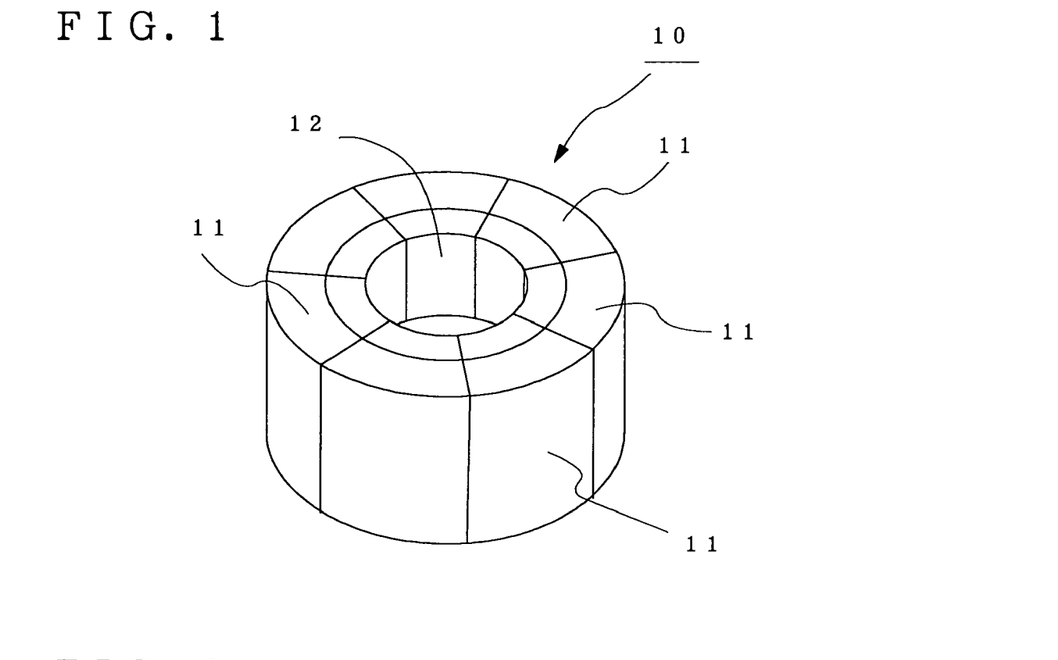
FIG. 1 is a diagram of an example of a vulcanizing mold for rubber molded articles according to the best embodiment of the present invention.
Figure 2:
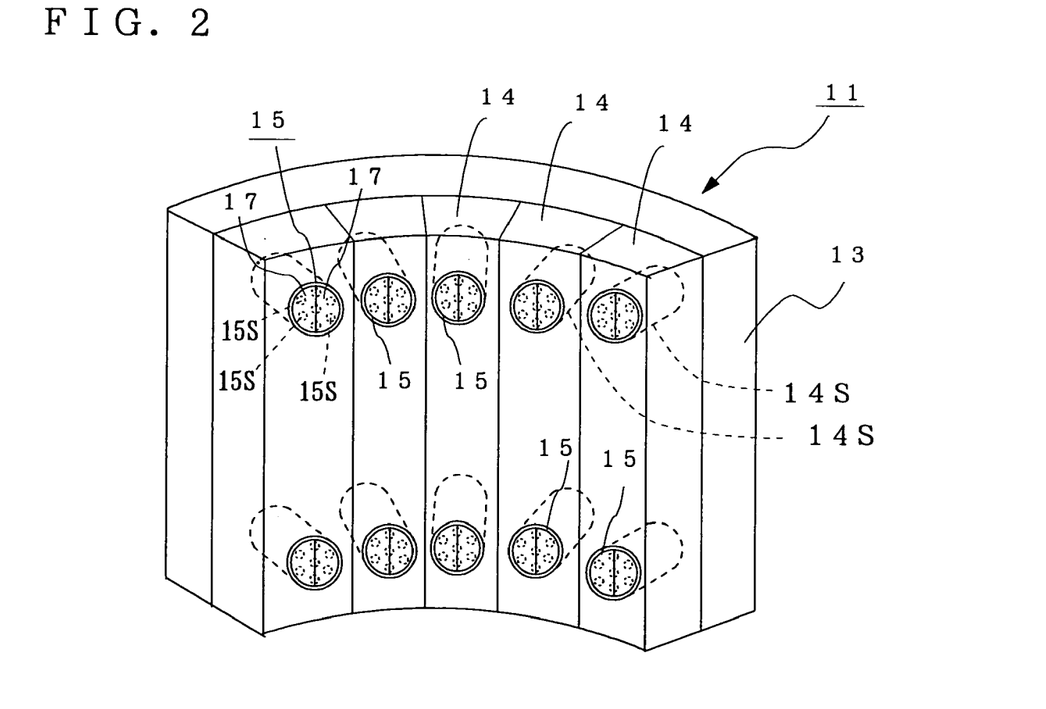
FIG. 2 is a diagram showing the constitution of segments of the vulcanizing mold for rubber molded articles according to the best embodiment of the present invention.

FIG. 1 is a diagram showing the basic constitution of a vulcanizing mold 10 for rubber molded articles according to the best embodiment of the present invention. The vulcanizing mold 10 for rubber molded articles of the present invention is constructed by combining a plurality of segments 11 into a substantially cylindrical form and has an opening 12 into which a rubber material (bladder) is inserted. As shown in FIG. 2, each of the above segments 11 consists of an outer case 13 made from a steel material and a plurality of pieces 14 made from aluminum and secured to the inner wall of the outer case 14 by bolts. The surfaces (portions exposed to the inner wall of the mold 10) of the above pieces 14 are tire forming surfaces, that is, portions to which crude tire rubber to be vulcanized is contacted.

Figure 3:
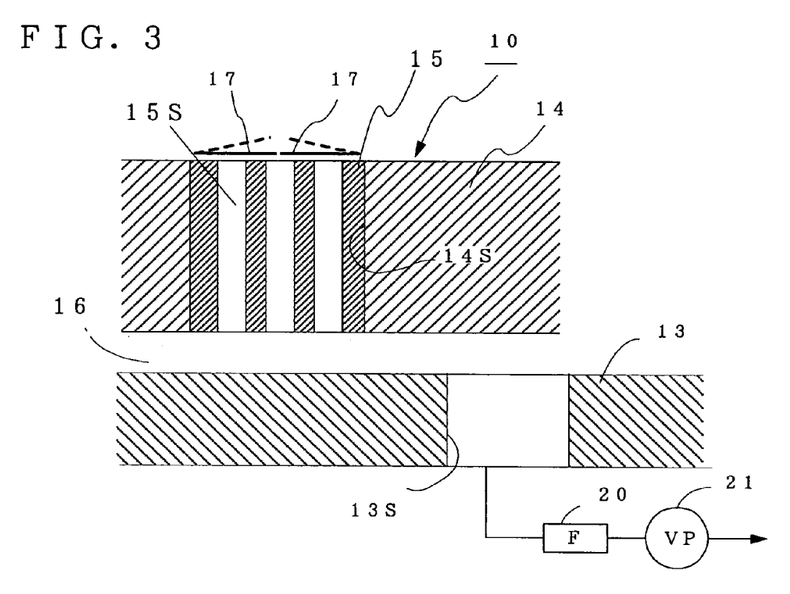
FIG. 3 is a partial sectional view showing the constitution of segments of the vulcanizing mold for rubber molded articles according to the best embodiment of the present invention.

A plurality of holes 14S communicating with exhaust holes which will be described hereinafter and are formed in the outer case 13 are formed in each of the above pieces 14, and a porous air vent 15 having a large number of pores 15S is fitted in each of the holes 14S. As shown in FIG. 3, the above pores 15S communicate with the exhaust holes 13S of the outer case 13 through a gap 16 between the pieces 14 and the outer case 13. The exhaust holes 13S are connected to a filter 20 for removing rubber powders and the like and to a vacuum pump (VP) 21 for absorbing air in the mold 10 and a gas generated during vulcanization.

Figure 4:
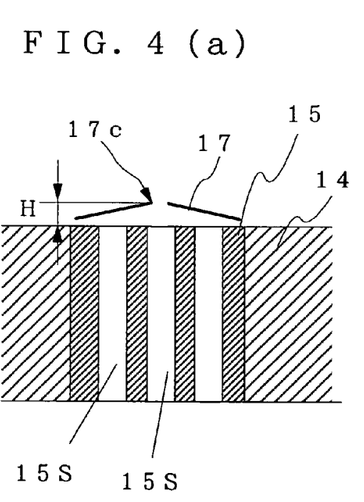
FIGS. 4(A) and 4(B) are diagrams for explaining the function of movable valves according to the best embodiment of the present invention.

In this embodiment, as shown in FIG. 2 and FIG. 3, semi-circular cover members 17 and 17 having a spring function for opening and closing the openings of the above pores 15S are provided on the cavity inner wall side (tire forming side) of the above porous air vent 15. The cover members 17 and 17 can be constructed by attaching leaf springs having a spring function which are urged to be opened toward the tire forming side to the periphery of the porous air vent 15. As shown in FIG. 4(A), the strength of the above springs is preferably adjusted such that the free ends 17c of the cover members 17 and 17 in an open state project toward the tire forming side by a distance H of 1 mm or less.

Since the above pores 15S communicate with the exhaust pores 13S through the gap 16 as described above, the vacuum pump (VP) 21 is activated at the time of vulcanization so that the above cover members 17 and 17 are absorbed toward the porous air vent 15 side as shown in FIG. 4(B) to close the openings of the pores 15S, or the above cover members 17 and 17 are closed by the pressure of the bladder. If rubber waste is generated on the above cover members 17 and 17, it will be discharged together with part of the tire as projecting rubber of the tire after vulcanization and therefore will not be accumulated in the pores 15S.

When the cover members 17 and 17 are closed, a very small gap G having an interval of 0.5 μm or less is formed between the above cover members 17 and 17 and the openings of the pores 15S. The above gap G may be formed by depositing a thin film layer as a spacer on part of the rear surfaces (porous air vent 15 side) of the above cover members 17 and 17 by sputtering or by removing part of the peripheral portions of the rear surfaces of the cover members 17 and 17 to form a spacer by etching or the like. Alternatively, the cover member 17 may be made circular and formed by sputtering or etching.

Therefore, at the time of vulcanization, as shown in FIG. 4(B), a plug material p larger than the above gap G does not reach the openings of the above pores 15S and only a plug material smaller than the gap G is taken into one of the pores 15S. The above small plug material easily passes through the pore 15S of the porous air vent 15 and is discharged to the outside of the mold 10 from the exhaust hole 13S of the outer case 13 through the gap 16. Therefore, the occurrence of the occlusion of the above pores 15S can be greatly reduced and exhaust efficiency can be improved.

Since the porous air vent 15 of this embodiment restricts the exhaust route to the pores 15S by means of the above gap G, the production of spew is rare and therefore a trimming step is not required.

In the mold 10 of this embodiment, if the cover members 17 and 17 are damaged or lost, only the cover members 17 and 17 may be exchanged. Thus, repair is easy. When the occlusion of the pores 15S is caused by the damage of the cover members 17 and 17, the porous air vent 15 is desirably exchanged.

A description is subsequently given of the method of cleaning the mold 10 for rubber molded articles having the above constitution.

Figure 5:
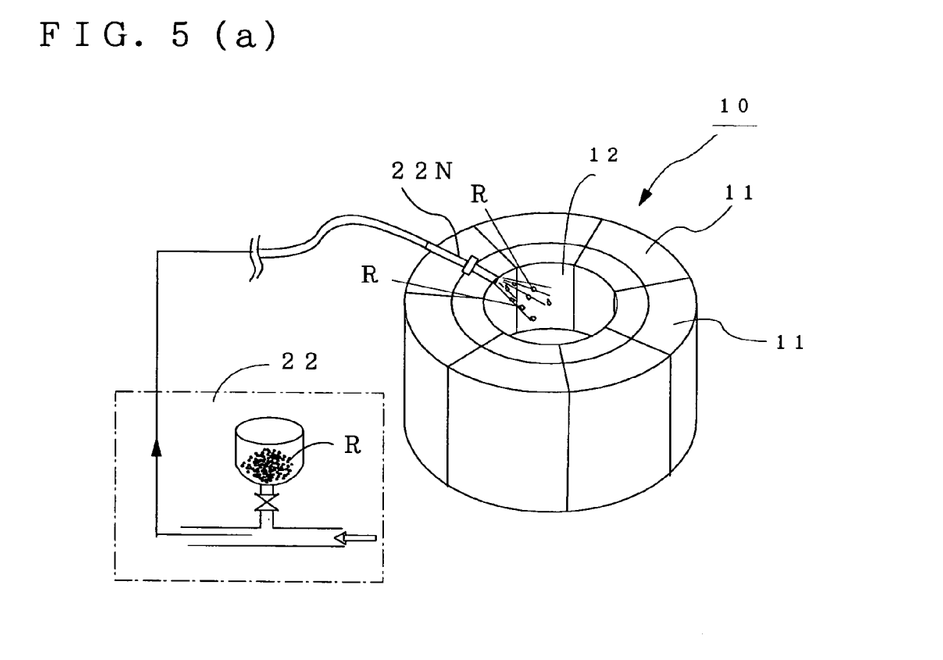
FIGS. 5(A) and 5(B) are diagrams showing a method of cleaning the vulcanizing mold for rubber molded articles according to the best embodiment of the present invention.

First, as shown in FIG. 5(A) and 5(B), the unshown vacuum pump (VP) is activated to absorb the above cover members 17 and 17 toward the porous air vent 15 side to close the openings of the pores 15S as the time of vulcanization. Then, a blast treatment for blasting a resin material R having relatively low hardness from a blast device 22 to the inner wall (tire forming side) of the mold 10 through a spray nozzle 22N is carried out to remove stains adhered to the surface of the mold 10. Thereby, almost 95% of all the stains can be removed.

Figure 6:
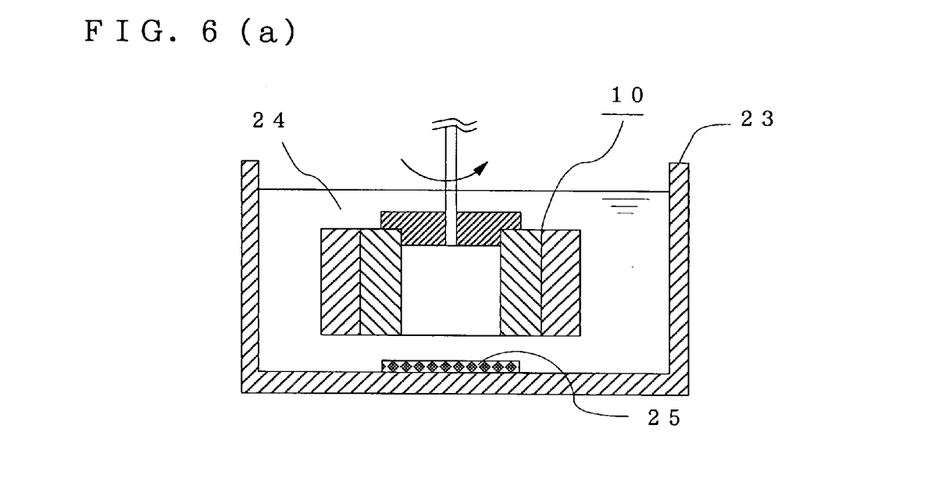
FIGS. 6(A) and 6(B) are diagrams showing the method of cleaning the vulcanizing mold for rubber molded articles according to the best embodiment of the present invention.

Subsequently, as shown in FIGS. 6(A) and 6(B), the above mold 10 is immersed in a cleaning liquid 24 maintained at 35 to 80° C. in a cleaning tank 23 to clean the above mold 10 while ultrasonic waves are generated in the above cleaning liquid 24 by ultrasonic wave generating means 25. At this point, as the cover members 17 and 17 are opened toward the tire forming side (inner wall side of the mold 2) by their spring function to open the openings of the pores 15S, the cleaning liquid 24 can go into the pores 15S easily. Since the above cover members 17 and 17 are closed to restrict the entry of the plug materials into the pores 15S during vulcanization as described above, the rear sides of the above cover members 17 and 17 and the insides of the pores 15S are rarely stained. Therefore, stains of the mold 10 can be easily removed by above ultrasonic cleaning.

When ultrasonic waves are applied from various directions of the mold 10 by moving the above ultrasonic wave generating means 25 in the cleaning liquid 24 horizontally or vertically, or turning the mold 10 in the cleaning liquid 24, stains in the pores 15s can be completely removed. The ultrasonic wave generating means 25 can be preferably moved vertically or turned in the opening 12 of the mold 10.

The above cleaning liquid 24 preferably contains aluminum which is the material of the mold 10 or a component which can prevent corrosion such as iron or SUS.

Figure 7:
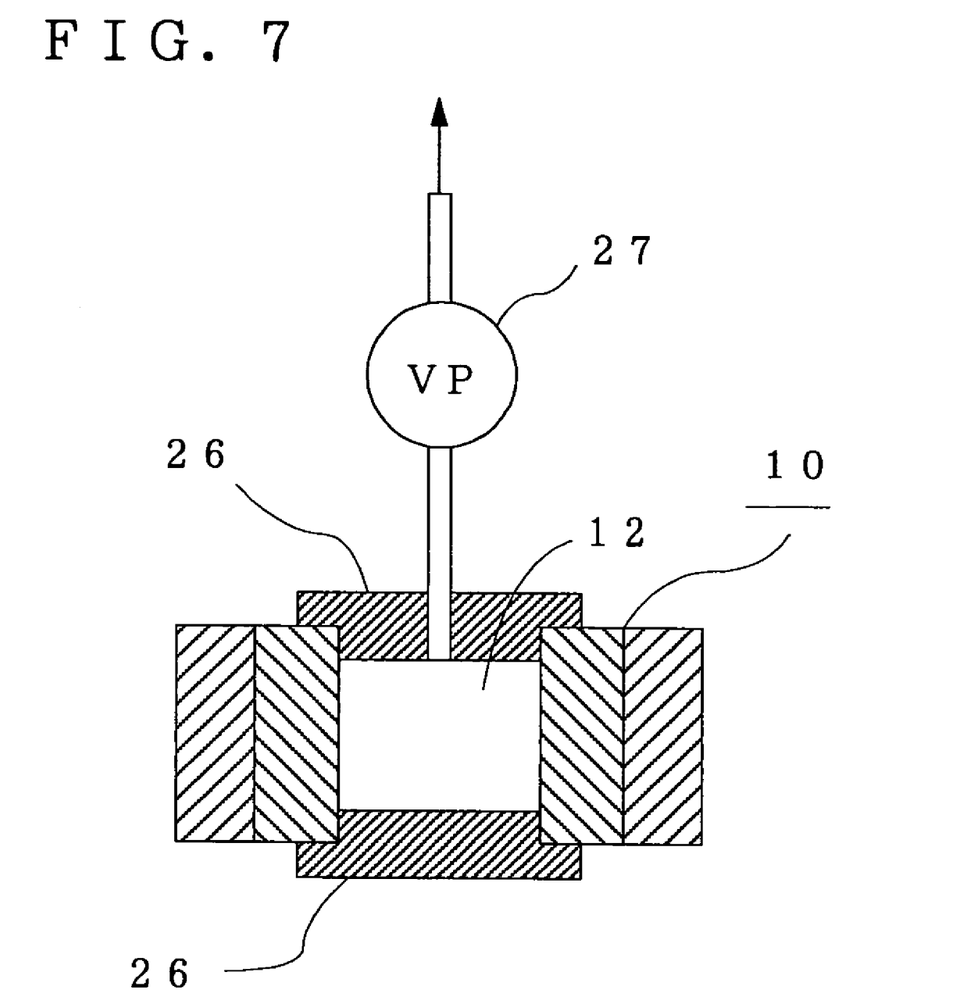
FIG. 7 is a diagram showing a post-treatment after ultrasonic cleaning.

After cleaning, the ultrasonic wave generating means 25 is lifted to collect the cleaning liquid 24, the opening 12 of the mold 10 is covered with covers 26 and 26 as shown in FIG. 7, the inside of the mold 10 is depressurized by using a vacuum pump 27 to discharge the stains of the mold 10 to the inner wall side of the mold, and the mold 10 is rinsed in water containing a rust preventive and dried. The mold 10 is dried by heating at 70 to 130° C. and further depressurized by the vacuum pump 27 to completely drain water, which is preferred as a pre-treatment before vulcanization.

Thereby all the stains of the mold 10 are removed.

Thus, in this embodiment, the semi-circular cover members 17 and 17 having a spring function for opening and closing the openings of the pores 15S are attached to the cavity inner wall side of the porous air vent 15, and the openings of the pores 15S are closed while a very small gap remains between the above cover members 17 and 17 and the openings of the pores 15S of the porous air vent during vulcanization. Therefore, the occurrence of the occlusion of the above pores 15S can be greatly reduced, exhaust efficiency can be improved, and a tire which rarely sees the production of spew or lip can be molded.

In this embodiment, since vulcanization is carried out while the openings of the above pores 15S are closed by the above cover members 17 and 17, the pores 15S are rarely stained, whereby at the time of cleaning, stains adhered to the cavity inner wall side of the mold 10 are removed by physical means such as a blast treatment while the above cover members 17 and 17 are closed, thereby making it possible to completely remove the stains of the above mold 10. Further, when the above openings are opened to allow the cleaning liquid 24 go into the above pores 15S so as to clean the above mold 10, stains in the pores 15S can be removed completely and easily.

In the above best embodiment, two semi-circular cover members 17 and 17 are used. The present invention is not limited to this embodiment and the cover members 17 may cover the openings of the pores 15S during vulcanization. Therefore, the number and shape of the cover members may be suitably determined according to the size and shape of the mold 10 or the porous air vent 15.

Figure 8A:
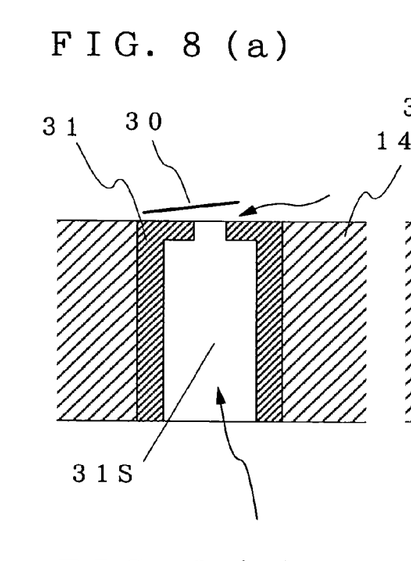
FIGS. 8(A) to 8(D) are diagrams of other examples of the vulcanizing mold for rubber molded articles of the present invention.
Figure 8B:
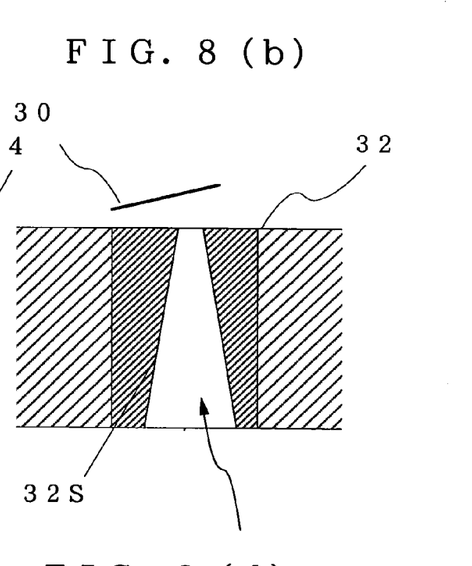
Figure 8C:
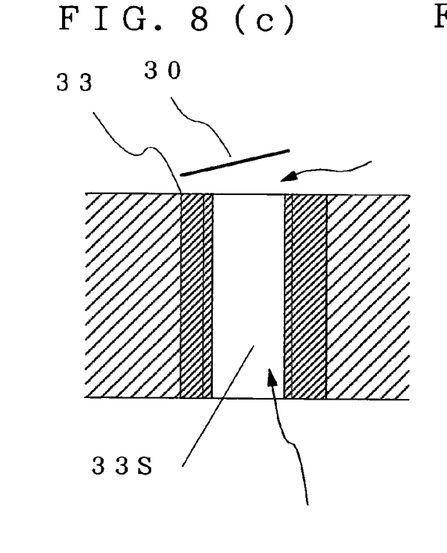
Figure 8D:
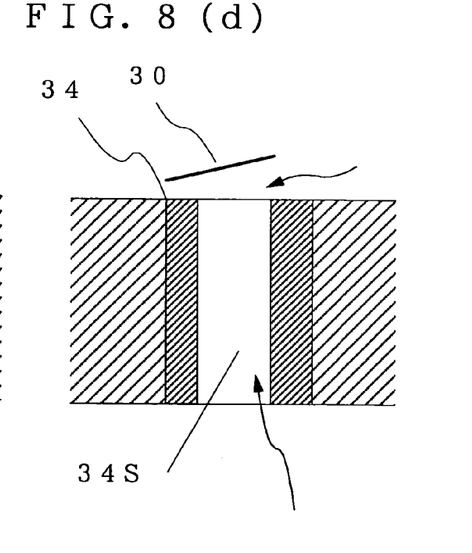

The porous air vent 15 has been described in the above embodiment. A homogenous air vent 31 having a stepped exhaust pore 31S as shown in FIG. 8(A), a homogeneous air vent 32 having a tapered exhaust pore 32S as shown in FIG. 8(B), and a homogeneous air vent 33 having an exhaust pore 33S with a thread as shown in FIG. 8(C) may also be used. In these cases, a circular cover member 30 manufactured by sputtering or etching may be used as the cover member. Further, when the circular cover member 30 manufactured by sputtering or etching is used, a homogeneous air vent 34 having a straight exhaust pore 34S as shown in FIG. 8(D) may be used.

INDUSTRIAL FEASIBILITY

As having been described above, according to the present invention, in a vulcanizing mold for rubber molded articles having air vents, each having exhaust passages opened to a cavity inner wall side at one end and communicating with the exhaust holes of the mold at the other end, a movable valve for opening and closing the openings of the exhaust passages and forming a small gap with the openings of the above exhaust passages when it is closed is provided on the cavity inner wall side of each of the above air vents, and the above movable valve is closed during vulcanization to restrict the entry of plug materials into the above pores. Therefore, the occlusion of the air vents can be reduced, exhaust efficiency can be improved, and a tire which rarely sees the production of spew or lip can be molded.

Since the above movable valve is closed during vulcanization and the entry of plug materials into the above exhaust passages is restricted, the rear side of the above movable valve and the exhaust passages are rarely stained, and the stains of the mold can be completely removed simply by separating stains adhered to the cavity inner wall side while the movable valve is closed.

Further, when the above mold is cleaned by opening the above openings to allow the cleaning liquid go into the above exhaust passages, not only stains on the surface of the mold but also stains in the exhaust passages can be completely removed.

What is claimed is:

1. A vulcanizing mold for rubber molded articles having air vents, each having exhaust passages opened to a cavity inner wall side at one end and communicating with the exhaust holes of the mold at the other end, wherein a movable valve for opening and closing the openings of the exhaust passages and forming a small gap with the openings of the exhaust passages when the movable valve is closed which is provided on the cavity inner wall side of each air vent.

2. The vulcanizing mold for rubber molded articles according to claim 1, wherein the movable valve is composed of one or more cover members having an opening/closing mechanism.

3. The vulcanizing mold for rubber molded articles according to claim 2, wherein the cover members are a pair of semi-circular plates.

4. The vulcanizing mold for rubber molded articles according to any one of claims 1 to 3, wherein the movable valve is a plate cover member having a spring function to be urged toward an open direction.

5. The vulcanizing mold for rubber molded articles according to any one of claims 2 to 3, wherein a stepped portion is formed by sputtering or etching the exhaust passage side of the cover member, and a gap between the cover member and the openings of the exhaust passages is maintained by the stepped portion.

6. The vulcanizing mold for rubber molded articles according to any one of claims 1 to 3, wherein the air vents are porous air vents, each having a porous member with a large number of pores which transmit only gas.

7. The vulcanizing mold for rubber molded articles according to claim 1, wherein the small gap permits release of gas or small plug materials that are discharged through the vulcanization operation.

* * * * *